(No Model.)
L. C. PORTER & C. McNICOL.
GRAIN DRIER AND CLEANER.
No. 257,064. Patented Apr. 25, 1882.
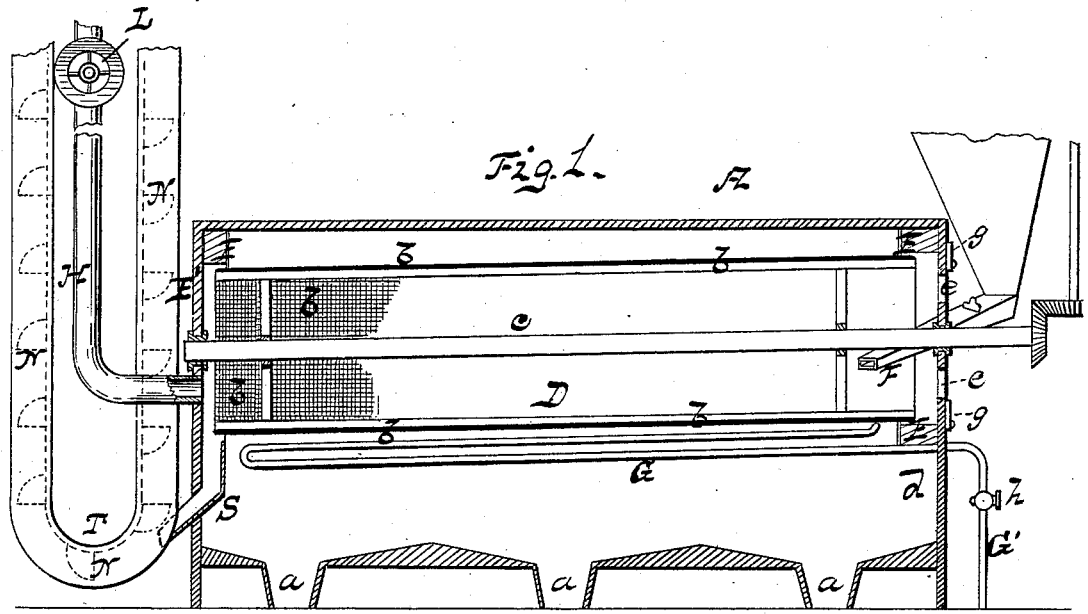
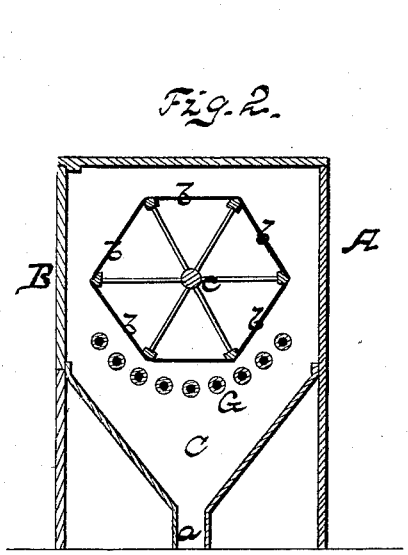
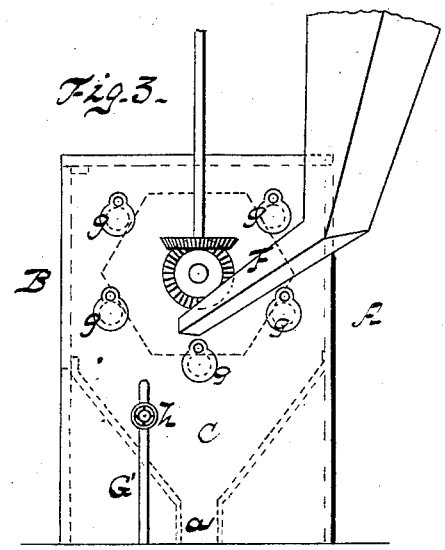
WITNESSES
INVENTORS
L. C. Porter
C. McNicol,
by Anderson & Smith
their ATTORNEYS

UNITED STATES PATENT OFFICE.

LEMUEL C. PORTER AND COLIN McNICOL, OF WINONA, MINNESOTA.

GRAIN DRIER AND CLEANER.

SPECIFICATION forming part of Letters Patent No. 257,064, dated April 25, 1882.

Application filed February 21, 1882. (No model.)

*To all whom it may concern:*

Be it known that we, LEMUEL C. PORTER and COLIN McNICOL, both citizens of the United States, and residents of Winona, in the county of Winona and State of Minnesota, have invented a new and valuable Improvement in Grain Driers and Cleaners; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical sectional view of our grain drier and cleaner. Fig. 2 is a cross-sectional view of the same. Fig. 3 is an end view.

This invention has relation to machines for drying, separating, and cleaning grain; and it consists in the construction and novel arrangement of steam-pipes partially or wholly surrounding a rotary screen-reel in a dust-tight case, inside guards or heads around the ends of the reel, draft-openings at the feed end of the case, and a blowing or suction fan connected to the discharge end and located near the branches of the elevator-tube, all as hereinafter set forth, and especially pointed out in the claim appended.

In the accompanying drawings, the letter A designates a dust-tight case, made of wood or metal, and having slides or doors B. In the lower part of the case are the hoppers C, having the inclined mouths $a$, which join to form the bottom of the case and serve to lead off the screenings which fall from the reel D, which is covered with wire-cloth $b$, and is provided with a shaft, $c$, which is seated in suitable end bearings, and is rotated by means of a belt or gearing. The reel is inclosed in the case from its receiving end to its discharging end, and is somewhat inclined toward the discharging end, as indicated.

Near each end of the case is an inside partition, guard, or head, E, having an opening to receive the end of the reel-screen, and serving to confine the draft and send it through the screen. In the end $d$ of the case are the draft-openings $e$, each of which is regulated by means of a valve or swinging stop, $g$. Through this end of the case extends the feed-pipe F, whereby the grain is conveyed to the reel.

G indicates a steam-pipe, which extends back and forth under the reel in such a manner as to form a series of parallel longitudinal pipes, lying near the under side of the reel, the inlet-pipe G' being provided with a stop-valve, $h$, whereby the steam heat can be regulated or cut off altogether.

The series of pipes may extend entirely around the reel, if thought desirable; but for ordinary purposes the arrangement under the bottom of the reel will be found sufficient, the pipes being placed equidistant from the reel-shaft, and forming a concave grating under the reel, through which the screenings fall to the hoppers below. The heat from the steam-pipe dries the screenings as they fall through its interspaces, and rising into the reel dries the grain in its passage therein, the accumulation of vapor being prevented by means of a suction-fan, L, having a pipe, H, which is connected to the discharging end E' of the case near the reel-shaft. In this manner a constant current of fresh hot and dry air is made to pass through the reel.

The grain is discharged by the spout S into the elevator-tube T, whence it is conveyed by the elevator-buckets N to suitable receptacles. The fan-pipe H, being arranged near and usually between the branches of the elevator-tube, serves to keep up the temperature therein. The spout S is connected to the elevator-tube in an air-tight manner, in order to avoid any interference with the draft through the reel.

Having described this invention, what we claim, and desire to secure by Letters Patent, is—

In a grain drier, separator, and cleaner, the combination, with the air-tight case A, having the inside head, E, draft-openings $e\ e$, discharge S, making an air-tight connection with the elevator-tube T, and bottom hoppers, C, of the screen-reel D, steam-pipe grating under the same, suction-fan L, and pipe H, substantially as specified.

In testimony that we claim the above we have hereunto subscribed our names in the presence of two witnesses.

LEMUEL CLARK PORTER.
COLIN McNICOL.

Witnesses:
ADELBERT PORTER,
I. S. H. PORTER.